US012774392B2

(12) United States Patent
Miyata et al.

(10) Patent No.: US 12,774,392 B2
(45) Date of Patent: Oct. 27, 2026

(54) THERMOEXPANDABLE REFRACTORY MATERIAL COMPOSITION, THERMOEXPANDABLE REFRACTORY MATERIAL, AND METHOD FOR PRODUCING THERMOEXPANDABLE REFRACTORY MATERIAL

(71) Applicant: SEKISUI CHEMICAL CO., LTD., Osaka (JP)

(72) Inventors: Shingo Miyata, Saitama (JP); Masami Kinoshita, Suita (JP); Takuto Ikeuchi, Kusatsu (JP); Yasuyuki Ishii, Ritto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 363 days.

(21) Appl. No.: 18/034,763

(22) PCT Filed: Nov. 5, 2021

(86) PCT No.: PCT/JP2021/040887
§ 371 (c)(1),
(2) Date: May 1, 2023

(87) PCT Pub. No.: WO2022/097740
PCT Pub. Date: May 12, 2022

(65) Prior Publication Data

US 2023/0407109 A1 Dec. 21, 2023

(30) Foreign Application Priority Data

Nov. 6, 2020 (JP) ................................ 2020-185975

(51) Int. Cl.

| | |
|---|---|
| ***C09D 5/18*** | (2006.01) |
| ***C09D 7/61*** | (2018.01) |
| ***C09D 123/08*** | (2006.01) |
| ***C09J 9/00*** | (2006.01) |
| ***C09J 11/04*** | (2006.01) |
| ***C09J 123/08*** | (2006.01) |

(52) U.S. Cl.
CPC ............... *C09D 5/185* (2013.01); *C09D 7/61* (2018.01); *C09J 9/00* (2013.01); *C09J 11/04* (2013.01); *C09D 123/0853* (2013.01); *C09J 123/0853* (2013.01)

(58) Field of Classification Search
CPC .... C09D 5/185; C09D 7/61; C09D 123/0853; C09D 5/00; C09D 201/00; C09J 9/00; C09J 11/04; C09J 123/0853; C09J 201/10; C09J 2203/33; C09J 2203/346; C09J 2203/354; C09J 2301/304; C09J 201/00; C08K 3/04; C08K 3/32; C08K 2003/323; C09K 21/02; C09K 21/04; C09K 21/12; E04B 1/94
See application file for complete search history.

(56) References Cited

U.S. PATENT DOCUMENTS

2015/0203731 A1 7/2015 Herrlich et al.

FOREIGN PATENT DOCUMENTS

| | | | |
|---|---|---|---|
| CN | 108136694 A * | 6/2018 | ........... B29C 70/025 |
| EP | 2 733 273 | 5/2014 | |
| EP | 3594424 A1 * | 1/2020 | ............... E06B 5/16 |
| JP | 57-145033 | 9/1982 | |
| JP | 11-50565 | 2/1999 | |
| JP | 2002-138596 | 5/2002 | |
| JP | 2004-176490 | 6/2004 | |
| JP | 2005-206632 | 8/2005 | |
| JP | 2006-231234 | 9/2006 | |
| JP | 2006-348229 | 12/2006 | |
| JP | 2007-113243 | 5/2007 | |
| JP | 2012-214646 | 11/2012 | |
| JP | 2012-214647 | 11/2012 | |
| JP | 2015-530429 | 10/2015 | |
| JP | 2017-20205 | 1/2017 | |
| JP | 2018-70879 | 5/2018 | |
| JP | 2018-155096 | 10/2018 | |
| JP | 2018-162397 | 10/2018 | |
| JP | 2019-189779 | 10/2019 | |
| JP | 2020-45390 | 3/2020 | |
| WO | WO-2005097908 A1 * | 10/2005 | .............. C08K 5/09 |
| WO | 2014/026741 | 2/2014 | |
| WO | 2014/162718 | 10/2014 | |
| WO | 2016/136896 | 9/2016 | |

OTHER PUBLICATIONS

CN108136694A Machine translation (Year: 2018).*
Machine translation WO2005097908A1 (Year: 2005).*
Machine Translation (Year: 2005).*
International Search Report (ISR) issued Jan. 18, 2022 in International (PCT) Application No. PCT/JP2021/040887.

* cited by examiner

*Primary Examiner* — Pamela H Weiss
(74) *Attorney, Agent, or Firm* — Wenderoth, Lind & Ponack, L.L.P.

(57) ABSTRACT

A thermally expandable fire-resistant material composition comprising an adhesive base and an a thermally expandable compound, wherein the thermally expandable fire-resistant material composition is flowable at an ordinary temperature or at a temperature lower than the expansion onset temperature of the thermally expandable fire-resistant material, and is solidifiable or curable.

14 Claims, No Drawings

THERMOEXPANDABLE REFRACTORY MATERIAL COMPOSITION, THERMOEXPANDABLE REFRACTORY MATERIAL, AND METHOD FOR PRODUCING THERMOEXPANDABLE REFRACTORY MATERIAL

TECHNICAL FIELD

The present invention relates to a thermally expandable fire-resistant material composition, a thermally expandable fire-resistant material formed from the thermally expandable fire-resistant material composition, and a method for producing the thermally expandable fire-resistant material.

BACKGROUND ART

Conventionally, thermally expandable fire-resistant materials that expand upon heating have been widely used in buildings and the like. The thermally expandable fire-resistant materials can prevent fires from occurring and spreading, because expansion residues resulting from expanding upon heating form a fire-resistant heat-insulating layer, which achieves fire-resistant insulation performance. The thermally expandable fire-resistant materials that comprise a resin and a thermally expandable compound such as an expandable graphite have been widely used, as described in, for example, PTL1. The thermally expandable fire-resistant material is generally fixed to buildings or the like via an adhesive layer laminated on the thermally expandable fire-resistant material.

CITATION LIST

Patent Literature

PTL1: JP 2020-45390 A

SUMMARY OF INVENTION

Technical Problem

However, when fixing the thermally expandable fire-resistant material via an adhesive layer, it is generally applied by hand, resulting in poor applicability. In addition, the thermally expandable fire-resistant material may be physically fixed with a fixing tool such as a metal fitting or a screw without using any adhesive layer, resulting in complicated application and poor applicability. Furthermore, fixing via no adhesive layer has a high risk that the combustion residues will fall off, and may not satisfy the desired fire-resistant performance.

Therefore, it is an object of the present invention to provide a thermally expandable fire-resistant material that can be easily applied to an object to be applied such as a building with good adhesion without using any adhesive layer or fixing tool.

Solution to Problem

The summary of the present invention is as follows:

[1] A thermally expandable fire-resistant material composition comprising an adhesive base and an a thermally expandable compound, wherein the thermally expandable fire-resistant material composition is flowable at an ordinary temperature or at a temperature lower than the expansion onset temperature of the thermally expandable compound, and is solidifiable or curable.

[2] The thermally expandable fire-resistant material composition according to [1], wherein the adhesive base comprises one or more selected from the group consisting of a hot-melt adhesive base, a one-liquid curable adhesive base, a two-liquid curable adhesive base, an emulsion-type adhesive base and a solvent-based adhesive base.

[3] The thermally expandable fire-resistant material composition according to [2], comprising the hot-melt adhesive base, wherein the hot-melt adhesive base comprises a base resin and a tackifying resin.

[4] The thermally expandable fire-resistant material composition according to [3], comprising the thermally expandable compound in the range of 10 to 300 parts by mass and the tackifying resin in the range of 10 to 300 parts by mass, with respect to 100 parts by mass of the base resin.

[5] The thermally expandable fire-resistant material composition according to any one of [2] to [4], which comprises the hot-melt adhesive base and has a melt viscosity of 300,000 Pa·s or less at a temperature not higher than the expansion onset temperature of the thermally expandable compound.

[6] The thermally expandable fire-resistant material composition according to any one of [2] to [5], comprising the hot-melt adhesive base, wherein the hot-melt adhesive base comprises at least one base resin selected from the group consisting of an ethylene-vinyl acetate copolymer resin, an ethylene-(meth)acrylate copolymer resin, a polyolefin-based resin and a rubber.

[7] The thermally expandable fire-resistant material composition according to [2], comprising the one-liquid curable adhesive base, wherein the one-liquid curable adhesive base is selected from the group consisting of a crosslinkable silyl group-containing acrylic-based polymer, a crosslinkable silyl group-containing polyoxyalkylene-based polymer and a crosslinkable silyl group-containing acrylic-modified polyoxyalkylene-based polymer.

[8] The thermally expandable fire-resistant material composition according to any one of [1] to [7], wherein the thermally expandable compound comprises a thermally expandable graphite.

[9] The thermally expandable fire-resistant material composition according to [8], wherein the thermally expandable compound further comprises an expandable flame retardant.

[10] A thermally expandable fire-resistant material, obtained by solidifying or curing the thermally expandable fire-resistant material composition according to any one of [1] to [9].

[11] The thermally expandable fire-resistant material according to [10], which has a volume expansion ratio of 10 times or more when heated at 600° C. for 10 minutes, and a residue hardness of 0.1 kgf/cm$^2$ or more.

[12] A method for producing a thermally expandable fire-resistant material, comprising: a step of coating or filling, an object to be applied, with the thermally expandable fire-resistant material composition according to any one of [1] to [9]; and a step of solidifying or curing the thermally expandable fire-resistant material composition with which the object to be applied has been coated or filled.

[13] The method for producing a thermally expandable fire-resistant material according to [12], wherein the thermally expandable fire-resistant material composition comprises the hot-melt adhesive base; and the method further comprises a step of melting the thermally expandable fire-resistant material composition.

Advantageous Effect of Invention

The present invention provides a thermally expandable fire-resistant material that can be easily applied to an object to be applied such as a building with good adhesion without using any adhesive layer or fixing tool.

DESCRIPTION OF EMBODIMENTS

Hereinafter, the present invention will be described in detail with reference to the embodiments thereof.

Thermally Expandable Fire-Resistant Material Composition

The thermally expandable fire-resistant material composition of the present invention comprises an adhesive base and a thermally expandable compound, and is flowable at an ordinary temperature (23° C.) or at a temperature lower than the expansion onset temperature of the thermally expandable compound. The thermally expandable fire-resistant material composition of the present invention is solidifiable or curable. When the flowable thermally expandable fire-resistant material composition is solidified or cured, it loses its flowability to provide a thermally expandable fire-resistant material.

The thermally expandable fire-resistant material composition of the present invention is flowable at an ordinary temperature or at a temperature lower than the expansion onset temperature of the thermally expandable compound, so that it can be easily applied to an object to be applied such as a building by coating or filling or the like. In addition, the thermally expandable fire-resistant material composition can be solidified or cured after applied by coating or the like to cause it to adhere to an object to be applied with good adhesion. The adhesion can be maintained well even after combustion.

The expansion onset temperature of the thermally expandable compound as used herein is as described later, but when two or more thermally expandable compounds are comprised, it means the expansion onset temperature of the thermally expandable compound having the lowest expansion onset temperature.

Solidification as used in the present invention means that a fluidized thermally expandable fire-resistant material composition is changed into a solid without reaction of components constituting the thermally expandable fire-resistant material composition, and is changed into a solid by volatilization of water or solvent, a phase change from a liquid to a solid, or the like. In contrast, curing as used in the present invention means that a thermally expandable fire-resistant material composition loses flowability with reaction of components constituting the thermally expandable fire-resistant material composition and is thereby changed into a solid. The thermally expandable fire-resistant material composition may undergo both solidification and curing to provide a thermally expandable fire-resistant material.

Thermally Expandable Compound

A thermally expandable compound is a compound that expands in itself or generates a gas or the like by heating to expand a thermally expandable fire-resistant material. When a thermally expandable fire-resistant material composition comprises the thermally expandable compound, the thermally expandable fire-resistant material expands by heating to a temperature equal to or higher than the expansion onset temperature of the thermally expandable compound and the expansion residues forms a fire-resistant heat-insulating layer.

Examples of the thermally expandable compound include a thermally expandable layered inorganic substance, an expandable flame retardant, a thermally expandable microcapsule, and a thermally decomposable foaming agent. The thermally expandable compounds may be used alone or in combination of two or more thereof.

Thermally Expandable Layered Inorganic Substance

The thermally expandable layered inorganic substance is a conventionally known substance that expands upon heating, and includes vermiculite and a thermally expandable graphite, and preferred is a thermally expandable graphite among them. The thermally expandable layered inorganic substances may be used alone or in combination of two or more thereof.

The thermally expandable layered inorganic substance to be used may be also in the form of a particle or a flake. The thermally expandable layered inorganic substance, particularly a thermally expandable graphite can be increased in the degree of expansion, so that it can form voids having a large volume when expanded by heating. The expansion onset temperature can be also adjusted to a temperature range suitable for a fire-resistant material. In addition, residue hardness of expansion residues can be easily increased, to provide a fire-resistant material excellent in fire-resistant performance and fire-extinguishing performance.

The thermally expandable graphite is produced by treating a powder of a natural flake graphite, a pyrolytic graphite, Kish graphite or the like with an inorganic acid and a strong oxidizing agent to form a graphite intercalation compound, and is one of crystalline compound which keeps the layered structure of carbon. Examples of the inorganic acid include concentrated sulfuric acid, nitric acid and selenic acid. Examples of the strong oxidizing agent include concentrated nitric acid, a persulfate, perchloric acid, a perchlorate, a permanganate, a bichromate and hydrogen peroxide. The thermally expandable graphite produced by acid treatment as described above may be further neutralized with ammonia, a lower aliphatic amine, an alkali metal compound, an alkaline earth metal compound and the like.

The thermally expandable graphite preferably has a particle size of 20 to 200 mesh. When the thermally expandable graphite has a particle size which falls within the above range, it expands to easily form voids having a large volume, thereby leading to an improvement in the fire-resistant performance. The dispersing ability into a resin is also improved.

The thermally expandable graphite preferably has an aspect ratio of 2 or more, more preferably 5 or more, and still more preferably 10 or more. The upper limit of the average aspect ratio of the thermally expandable graphite is not particularly limited, but it is preferably 1,000 or less from the viewpoint of crack prevention of the thermally expandable graphite. When the thermally expandable graphite has an average aspect ratio of 2 or more, it expands to easily form voids having a large volume, leading to an improvement in flame retardancy.

The average aspect ratio of the thermally expandable graphite is an average of the values determined by measuring the maximum dimension (longest diameter) and the minimum dimension (shortest diameter) of each of 10 pieces of thermally expandable graphite and dividing the maximum dimension (longest diameter) by the minimum dimension (shortest diameter). The largest diameter and shortest diameter of the thermally expandable graphite can be measured, for example, by using a field emission scanning electron microscope (FE-SEM).

Expandable Flame Retardant

Examples of the expandable flame retardant include a phosphorus-containing compounds such as ammonium phosphate, ammonium polyphosphate, aluminum phosphite, and melamine polyphosphate. The expandable flame retardant is a flame retardant that can provide a thermally expandable fire-resistant material with flame retardancy, while having the property of expanding itself by heating. The expandable flame retardants may be used alone or in combination of two or more thereof. The expandable flame retardant is preferably at least one selected from ammonium polyphosphate and aluminum phosphite, from the viewpoint of fire-resistant performance and residue hardness.

Thermally Expandable Microcapsule

The thermally expandable microcapsule has a volatile substance such as a low-boiling solvent encapsulated inside an outer shell resin. The encapsulated volatile substance volatilizes or expands, so that the resulting pressure causes the outer shell to expand and the particle size to increase.

The outer shell of the thermally expandable microcapsule is preferably formed of a thermoplastic resin. The thermoplastic resin to be used can be one or two or more of a vinyl polymer or copolymer of ethylene, styrene, vinyl acetate, vinyl chloride, vinylidene chloride, acrylonitrile, butadiene or chloroprene; a polyamide such as nylon 6 or nylon 66; and a polyester such as polyethylene terephthalate. Among them, a copolymer of acrylonitrile is preferred because the encapsulated volatile substance is difficult to permeate it. The volatile substance encapsulated in the thermally expandable microcapsule to be used is one or two or more low boiling liquid selected from the group consisting of a hydrocarbon having 3 to 7 carbon atoms such as propane, propylene, butene, n-butane, isobutane, isopentane, neopentane, n-pentane, hexane or heptane; a halide such as methyl chloride or methylene chloride, a chlorofluorocarbon such as $CCl_3F$ and $CCl_2F_2$; a tetraalkyl silane such as tetramethyl silane or trimethylethyl silane, and petroleum ether.

Suitable examples of the thermally expandable microcapsule include a microcapsule having a copolymer of acrylonitrile and vinylidene chloride as an outer shell resin and having a hydrocarbon having 3 to 7 carbon atoms, such as isobutane, encapsulated.

The thermally expandable microcapsules may be used alone or in combination of two or more thereof.

Thermally Decomposable Foaming Agent

The thermally decomposable foaming agent include a compound that foams by heating to generate a gas. The gas generated by the thermally decomposable foaming agent causes a thermally expandable fire-resistant material composition to expand. The thermally decomposable foaming agent to be used can be an organic or inorganic chemical foaming agent.

Examples of the organic foaming agent include azodicarbonamide; a metal salt of azodicarboxylic acid (such as barium azodicarboxylate); an azo compound such as azobisisobutyronitrile; a nitroso compound such as N,N'-dinitrosopentamethylene tetramine; a hydrazine derivative such as hydrazodicarbonamide, 4, 4'-oxybis(benzenesulfonyl hydrazide) or toluenesulfonyl hydrazide; a semicarbazide compound such as toluenesulfonyl semicarbazide; melamine; dicyandiamide; and Pentarit (pentaerythritol).

Examples of the inorganic foaming agent include ammonium carbonate, sodium carbonate, ammonium hydrogen carbonate, sodium hydrogen carbonate, ammonium nitrite, sodium borohydride and anhydrous monosodium citrate.

Among these, from the viewpoint of producing fine cells and from the viewpoint of economy and safety, an azo compound and a nitroso compound are preferred, and azodicarbonamide, azobisisobutyronitrile and N,N'-dinitrosopentamethylene tetramine is more preferred, and azodicarbonamide is particularly preferred. The thermally decomposable foaming agents may be used alone or in combination of two or more thereof.

When a thermally expandable microcapsule or a thermally decomposable foaming agent is used as the thermally expandable compound, the thermally expandable fire-resistant composition preferably further comprises at least one selected from the group consisting of an expandable flame retardant and a flame retardant in order to provide a proper fire-resistant performance.

The expansion onset temperature of the thermally expandable compound is preferably 100 to 250° C. If the expansion onset temperature is equal to or higher than the above-described lower limit, the thermally expandable fire-resistant material can be prevented from accidentally expanding except when fires occur. If the expansion onset temperature is equal to or lower than 250° C., the thermally expandable fire-resistant material can expand rapidly on the occurrence of fires, leading to an increase in fire-resistant performance and fire-extinguishing performance. From these viewpoints, the expansion onset temperature is more preferably 125 to 200° C., still more preferably 150 to 195° C. and even more preferably 155 to 190° C.

The thermally expandable compound having such an expansion onset temperature as described above preferably includes a thermally expandable graphite. Therefore, the expansion onset temperature of the thermally expandable graphite is preferably 100 to 250° C., more preferably 125 to 200° C., still more preferably 150 to 195° C. and even more preferably 155 to 190° C.

When the thermally expandable fire-resistant composition comprises two or more thermally expandable compounds, the expansion onset temperature of at least one of the thermally expandable compounds should be within the above range, but the thermally expandable compound having the lowest expansion onset temperature preferably has an expansion onset temperature within the above range. For example, when the thermally expandable compound comprises a thermally expandable graphite and an expandable flame retardant, the expansion onset temperature of the thermally expandable graphite is lower than the expansion onset temperature of the expandable flame retardant. Therefore, as described above, the expansion onset temperature of the thermally expandable graphite should be within the above range.

The expansion onset temperature is, as described below, a value obtained with a rheometer by heating the thermally expandable compound and measuring the temperature at which the normal direction force begins to rise. The expansion onset temperature of the thermally decomposable foaming agent is generally not detected by the above measurement method, but the temperature at which it decomposes to generate a gas (decomposition temperature) should be within the above temperature range.

The content of the thermally expandable compound in the thermally expandable fire-resistant material composition is preferably 10 to 80% by mass based on the total solid content of the thermally expandable fire-resistant material composition. When the thermally expandable fire-resistant material composition comprises such a content of the thermally expandable compound as is no less than the above lower limit or more, it has a sufficiently high expansion ratio during combustion, so that the thermally expandable fire-resistant material is improved in fire-resistant performance. On the other hand, when the thermally expandable fire-resistant material composition comprises such a content of the thermally expandable compound as is no more than the above upper limit, it can comprise an amount of adhesive base above a certain level, so that good adhesion can be easily developed. In addition, after solidification or curing, the thermally expandable compound is easy to be properly retained by the adhesive base, so that the thermally expandable fire-resistant material is also improved in mechanical strength.

The content of the thermally expandable compound in the thermally expandable fire-resistant material composition is more preferably 15 to 70% by mass, still more preferably 20 to 60% by mass, and even more preferably 25 to 55% by mass.

Among the above thermally expandable compounds, it is preferable to use at least one of the thermally expandable graphite and the expandable flame retardant. The use of the thermally expandable graphite and/or the expandable flame retardant as a thermally expandable compound provides the thermally expandable fire-resistant material with flame retardancy, making it easier to be improved in fire-resistant performance.

It is more preferable to use at least thermally expandable graphite as a thermally expandable compound. The use of the thermally expandable graphite makes it easier to adjust the expansion onset temperature within the above range and to increase the expansion ratio and residue hardness.

The content of the thermally expandable graphite in the thermally expandable fire-resistant material composition is preferably 5 to 60% by mass based on the total solid content of the thermally expandable fire-resistant material composition. When the thermally expandable fire-resistant material composition comprises such a content of the thermally expandable graphite as is no less than the above lower limit or more, it makes it easier to be high in expansion ratio and residue hardness, so that the thermally expandable fire-resistant material is improved in fire-resistant performance. On the other hand, when the thermally expandable fire-resistant material composition comprises such a content of the thermally expandable compound as is no more than the above upper limit, it can comprise an amount, above a certain level, of a component other than the thermally expandable graphite, such as an adhesive base or an expandable flame retardant, so that the thermally expandable fire-resistant material is easily improved in various performances.

The content of the thermally expandable compound in the thermally expandable fire-resistant material composition is more preferably 7 to 50% by mass, still more preferably 10 to 40% by mass, and even more preferably 15 to 30% by mass, based on the total solid content of the thermally expandable fire-resistant material composition.

It is also preferable to use a thermally expandable graphite and an expandable flame retardant in combination as a thermally expandable compound. The content of the thermally expandable graphite when using these in combination is as described above. On the other hand, the content of the expandable flame retardant in the thermally expandable fire-resistant material composition is preferably 5 to 70% by mass based on the total solid content of the thermally expandable fire-resistant material composition. When the thermally expandable fire-resistant material composition comprises such a content of the expandable flame retardant as is no less than the above lower limit or more, it can be easily increased in expansion ratio and residue hardness, so that the thermally expandable fire-resistant material is improved in fire-resistant performance. On the other hand, when the thermally expandable fire-resistant material composition comprises such a content of the expandable flame retardant as is no more than the above upper limit, it can comprise an amount of adhesive base above a certain level of a component other than the expandable flame retardant such as an adhesive base or a thermally expandable graphite, so that the thermally expandable fire-resistant material is improved in various performances.

The content of the expandable flame retardant in the thermally expandable fire-resistant material composition is more preferably 10 to 50% by mass, still more preferably 15 to 40% by mass, and even more preferably 20 to 35% by mass.

When the thermally expandable graphite and the expandable flame retardant are used in combination, the mass ratio of the content of the expandable flame retardant to the thermally expandable graphite in the thermally expandable fire-resistant material composition (expandable flame retardant/thermally expandable graphite) is preferably 0.1 to 10. When the thermally expandable fire-resistant material composition has the content ratio by mass in the above range, it can be easily increased in expansion ratio and residue hardness, so that the thermally expandable fire-resistant material is improved in fire-resistant performance. From these viewpoints, the content ratio is more preferably 0.2 to 5, still more preferably 0.5 to 3, and even more preferably 0.8 to 2.

Adhesive Base

The thermally expandable fire-resistant material composition comprises an adhesive base. The adhesive base is an adhesive component for causing an object to be applied to exhibit adhesion. Examples of the adhesive base include a hot-melt adhesive base, a one-liquid curable adhesive base, a two-liquid curable adhesive base, an emulsion-type adhesive base and a solvent-based adhesive base.

Hot-Melt Adhesive Base

The hot-melt adhesive base is not flowable at an ordinary temperature, but it exhibits fluidity when heated. The heated hot-melt adhesive base is solidified by cooling it back to an ordinary temperature. When the thermally expandable fire-resistant material composition of the present invention comprises a hot-melt adhesive base, it is a hot-melt type composition.

When the hot-melt adhesive base is used as an adhesive base in the thermally expandable fire-resistant material composition of the present invention, adhesion to an object to be applied is easily maintained well not only before combustion but also after combustion. Thereby, the expansion residues after combustion can continue to adhere to the object to be applied, so that the thermally expandable fire-resistant material is improved more in fire-resistant performance. In addition, when the hot-melt adhesive base is used, the thermally expandable fire-resistant material composition can be allowed to cool and immediately solidify, after coating followed by allowing it to stand near an ordinary temperature, so that the thermally expandable fire-resistant material composition is improved in workability.

The hot-melt adhesive base to be used may be any resin that is conventionally used as a base resin for the hot-melt adhesive (hereinafter also referred to as "base resin"). Specific examples of the base resin to be used can include an ethylene-vinyl acetate copolymer resin (EVA), an ethylene-(meth)acrylate copolymer resin, a polyolefin-based resin and a rubber. The base resins may be used alone or in combination of two or more thereof.

Among these, preferred is at least one selected from an ethylene-vinyl acetate copolymer resin (EVA) and an ethylene-(meth)acrylate copolymer resin. When these are used, the thermally expandable fire-resistant material composition can be improved in adhesion to an object to be applied and is easily improved in adhesion to an object to be applied not only before combustion but also after combustion. Furthermore, excellent adhesion performance is obtained to a metal object to be applied. Among these, the ethylene-vinyl acetate copolymer resin (EVA) is more preferred as a base resin for the hot-melt adhesive base.

The ethylene-vinyl acetate copolymer resin (EVA) used for the hot-melt adhesive base is not particularly limited as long as it is a resin obtained by copolymerizing ethylene and vinyl acetate. The vinyl acetate content of the ethylene-vinyl acetate copolymer resin is, but not particularly limited to, preferably 15 to 45% by mass, more preferably 20 to 40% by mass and still more preferably 25 to 35% by mass, from the viewpoint of being suitably used as a hot-melt adhesive base. The vinyl acetate content is as measured in accordance with JIS K 6924-1:1997.

Examples of the (meth)acrylate constituting the ethylene-(meth)acrylate copolymer resin include an alkyl (meth) acrylate, such as methyl acrylate, ethyl acrylate, n-propyl acrylate, n-butyl acrylate, isobutyl acrylate, 2-ethylhexyl acrylate, isooctyl acrylate, methyl methacrylate or ethyl methacrylate, and a (meth)acrylate having a functional group such as an epoxy group or a hydroxyl group, such as 2-hydroxyethyl acrylate or glycidyl acrylate. These may be used alone or in combination of two or more thereof.

The ethylene-(meth)acrylate copolymer resin may also have a third component, such as carbon monoxide or maleic anhydride, copolymerized therewith.

The ethylene-(meth)acrylate copolymer resin is preferably an ethylene-methyl methacrylate copolymer (EMMA).

The content of a building block derived from the (meth) acrylate in the ethylene-(meth)acrylate copolymer resin is, but not particularly limited, for example, 5 to 50% by mass, preferably 10 to 40% by mass, and more preferably 15 to 35% by mass.

Examples of the polyolefin-based resin include at least one olefinic copolymer obtained by copolymerizing ethylene with an α-olefin having 3 to 20 carbon atoms. Examples of the α-olefin having 3 to 20 carbon atoms include propylene, isobutylene, 1-butene, 1-pentene, 1-hexene, 4-methyl-1-pentene and 1-octene. Among the above olefinic copolymers, a copolymer of ethylene and an α-olefin having 6 to 8 carbon atoms are preferred, and a copolymer of ethylene and 1-octene is more preferred. These olefinic copolymers may be used alone or in combination of two or more thereof.

The above olefinic copolymer preferably has a copolymerization percentage of α-olefin of 20 to 40 mol %. The olefinic copolymer preferably has a melt flow rate (g/10 min) of 5 to 2,500 and more preferably 150 to 2,500. The melt flow rate of the olefinic copolymer is as measured under a load of 21.2 N at 190° C. in accordance with JIS K7210.

Examples of the copolymer of ethylene and 1-octene to be used can include products manufactured by Dow Chemical Company, which are synthesized using a single-site metallocene catalyst and are commercially available under the trade name "Affinity EG8185" (MFR=30), the trade name "Affinity EG8200" (MFR=5), the trade name "Affinity GA1900" (MFR=1000), the trade name "Affinity GA1950" (MFR=500) and the trade name "Affinity PT1409" (MFR=6). These commercially available copolymers of ethylene and 1-octene have a copolymerization percentage of 1-octene of 35 to 37 mol %.

Copolymers other than the above-described copolymers of ethylene and α-olefin having 3 to 20 carbon atoms can also be used. They may include a polyethylene, a polypropylene, a polyhexene, a polyoctene, a propylene-butene copolymer, a propylene-hexene copolymer and a propylene-octene copolymer. These polyolefin resins may also be appropriately selected, for example, so that the melt flow rate is within the above range.

Examples of the rubber to be used for the hot-melt adhesive base include a diene-based rubber such butadiene, styrene-butadiene, chloroprene or butadiene-acrylonitrile; a non-diene-based rubber such as isobutylene-isoprene or ethylene-propylene; a styrenic rubber; an olefinic rubber; an ester-based rubber; and a urethane-based rubber.

The melt flow rate (MFR) of the base resin used for the hot-melt adhesive base is not particularly limited, but from the viewpoint of coatability, adhesion or the like, it is, for example, 1 to 3000 g/10 min, preferably 5 to 2500 g/10 min, more preferably 10 to 1500 g/10 min, still more preferably 100 to 1000 g/10 min, and even more preferably 150 to 1000 g/10 min. The melt flow rate is as measured under a load of 21.2 N at 190° C. The melt flow rate of an ethylene-vinyl acetate copolymer resin is preferably measured in accordance with JIS K 6924-1:1997. The melt flow rate of base resins, other than the ethylene-vinyl acetate copolymer resin, such as an ethylene-(meth)acrylate copolymer resin may be measured in accordance with JIS K7210:1999.

The base resin used for the hot-melt adhesive base may be commercially available products. "Ultrasen 726" manufactured by Tosoh Corporation can be used as an ethylene-vinyl acetate copolymer resin, and "ACRYFT CM5021" manufactured by SUMITOMO CHEMICAL COMPANY, LIMITED can be used as an ethylene-methyl methacrylate copolymer.

The hot-melt adhesive base preferably comprises a tackifying resin in addition to the above base resin. Examples of the tackifying resin include a rosin-based tackifying resin, a terpene-based tackifying resin, a petroleum resin-based tackifying resin, and a coumarone resin-based tackifying resin.

Examples of the rosin-based tackifying resin include a gum rosin, a wood rosin, a polymerized rosin, a disproportionated rosin, a hydrogenated rosin, a dimerized rosin; an ester of the above rosin with pentaerythritol, glycerin, diethylene glycol or the like (a rosin ester); and a rosin-phenolic resin.

Examples of the terpene-based tackifying resin include a terpene resin, a copolymer of terpene and styrene, a copolymer of terpene and α-methylstyrene and a copolymer of terpene and phenol, and a hydrogenated product thereof.

Examples of the petroleum resin-based tackifying resin include an aliphatic petroleum resin, an alicyclic petroleum resin, an aromatic petroleum resin, an aliphatic-aromatic copolymer petroleum resin, and a hydrogenated product thereof.

The petroleum resin-based tackifying resin is preferably a non-hydrogenated C9 petroleum resin. The term "non-hydrogenated C9 petroleum resin" refers to a resin which is obtained by (co)polymerizing the C9 to C10 fractions, i.e., aromatic fractions contained in the cracked petroleum fraction produced as a by-product in steam cracking of petroleum and which has not been hydrogenated. These non-hydrogenated C9 petroleum resins may be used alone or in combination of two or more thereof. The term "(co)polymerization" means homopolymerization or copolymerization. Examples of the C9 to C10 fractions (aromatic fractions) include, but are not particularly limited to, vinyl aromatic hydrocarbons such as vinyl toluene, indene, styrene or α-methylstyrene.

Examples of the coumarone resin-based tackifying resin include a coumarone resin and coumarone-indene resin. In addition to the above, a xylene resin can also be used as a tackifying resin. Among the above-described tackifying resins, a petroleum-based tackifying resin and a rosin-based tackifying resin are preferred. The above tackifying resins may be used alone or in combination of two or more thereof.

The softening point of the tackifying resin is, but not particularly limited, for example, 90 to 150° C., preferably 100 to 140° C., and more preferably 110 to 130° C. When the thermally expandable fire-resistant material composition has a softening point within the above range, it can be improved in adhesion coatability, strength after solidification or curing, and the like in a balanced manner. The softening point is a softening temperature as measured by a ring-and-ball method in accordance with JISK2207.

When the adhesive base comprises a base resin and a tackifying resin as a hot-melt adhesive base, the content of the tackifying resin is preferably 10 to 300 parts by mass with respect to 100 parts by mass of the base resin. When the content of the tackifying resin is 10 parts by mass or more, the thermally expandable fire-resistant material composition can be enhanced in adhesion by the tackifying resin. When the content of the tackifying resin is 300 parts by mass or less, the thermally expandable fire-resistant material can be prevented from being impaired in strength after solidification or curing or the like, due to the tackifying resin. The content of the tackifying resin is more preferably 25 to 200 parts by mass and more preferably 40 to 120 parts by mass.

When the adhesive base comprises a hot-melt adhesive base, the content of the thermally expandable compound is preferably 10 to 300 parts by mass with respect to 100 parts by mass of the base resin. When the content of the thermally expandable compound is no less than the above lower limit, the thermally expandable fire-resistant material can be provided with good fire-resistant performance. When the content of the compound is no more than 300 parts by mass, the thermally expandable fire-resistant material tends to be improved good in strength. From these viewpoints, the content of the thermally expandable compound is more preferably 25 to 250 parts by mass and still more preferably 50 to 200 parts by mass.

When the adhesive base comprises a hot-melt-based adhesive base, the melt viscosity of the thermally expandable fire-resistant material composition is preferably 300,000 mPa·s or less at a temperature not higher than the expansion onset temperature of the thermally expandable compound. If the melt viscosity is 300,000 mPa·s or less at a temperature not higher than the expansion onset temperature, the applicability can be improved, for example, the thermally expandable fire-resistant material composition can be coated on the object to be applied with good coatability without expanding the thermally expandable compound. From the viewpoint of coatability and applicability, the melt viscosity is more preferably 200,000 mPa·s or less and still more preferably 150,000 mPa·s or less. The term "expansion onset temperature" as used herein means the expansion onset temperature of the thermally expandable compound having the lowest expansion onset temperature when the thermally expandable fire-resistant material composition comprises two or more thermally expandable compounds.

When the adhesive base comprises a hot-melt-based adhesive base, the melt viscosity at 150° C. of the thermally expandable fire-resistant material composition is preferably 300,000 m·Pa·s or less, more preferably 200,000 mPa·s or less and still more preferably 150,000 m·Pa·s or less. When the melt viscosity at 150° C. is no more than these upper limits, the applicability is improved even when the thermally expandable compound having a suitable expansion onset temperature is used.

The melt viscosity at 150° C. of the thermally expandable fire-resistant material composition is not particularly limited, but is preferably 400 mPa·s or more, more preferably 4,000 mPa·s or more and still more preferably 10,000 mPa·s or more, from the viewpoint of preventing dripping when coating the composition.

The hot-melt-based adhesive is an adhesive base that is prone to dripping, but it can be improved in thixotropic properties and greatly reduced in dripping by adding an inorganic filler such as calcium carbonate.

One-Liquid Curable Adhesive Base

According to the present invention, the use of a one-liquid curable adhesive base as an adhesive base enables the thermally expandable fire-resistant material composition to be of one-liquid curable type. The one-liquid curable adhesive base is preferably a moisture-curable adhesive base that cures with moisture in the air.

Examples of the one-liquid curable adhesive base to be used can include a crosslinkable silyl group-containing polymer, an isocyanate group-containing polymer and a cyanoisocyanate-based adhesive base. These may be used alone or in combination of two or more thereof.

When use of the one-liquid curable adhesive base is used, the thermally expandable fire-resistant material can be prevented from dripping or the like due to heating after application.

Among the above one-liquid curable adhesive base, the crosslinkable silyl group-containing polymer is preferred. The specific crosslinkable silyl group in the crosslinkable silyl group-containing polymer is a functional group represented by the following formula (1). The number of crosslinkable silyl group in the crosslinkable silyl group-containing polymer is not particularly limited as long as it is one or more, but is preferably about 1 to 5 and more preferably about 2 to 4.

$$-SR^1_aX_{3-a} \quad (1)$$

In formula (1), $R^1$ is a hydrocarbon group, preferably an alkyl group having 1 to 20 carbon atoms, an aryl group having 6 to 20 carbon atoms or an aralkyl group having 7 to 20 carbon atoms, and more preferably an alkyl group having 1 to 4 carbon atoms. X represents a reactive group, and the reactive group represented by X are a group selected from the group consisting of a halogen atom, a hydrogen atom, a hydroxyl group, an alkoxy group, an acyloxy group, a ketoximate group, an amide group, an acid amide group, a mercapto group, a ketoxime group, an alkenyloxy group and an aminooxy group, and when the number of X is two or more, X may be the same group or different groups. Among them, X is preferably an alkoxy group or a ketoxime group, and more preferably an alkoxy group. The alkoxy group is more preferably a methoxy group. A is an integer of 0, 1 or 2, and more preferably 0 or 1.

The crosslinkable silyl group-containing polymer is preferably at least one selected from the group consisting of a crosslinkable silyl group-containing polyoxyethylene-based polymer, a crosslinkable silyl group-containing acrylic-based polymer and a crosslinkable silyl group-containing acrylic-modified polyoxyethylene-based polymer (sometimes collectively referred to as "modified silicone").

When these modified silicones are used as a one-liquid curable adhesive base, the thermally expandable fire-resistant material can be increased in residual hardness and expansion ratio in a balanced manner. The thermally expandable fire-resistant material can also have good weather resistance and can be suitably used outdoors. Furthermore, the thermally expandable fire-resistant material tends to have good adhesion strength to an object to be applied made of various materials.

The crosslinkable silyl group-containing polyoxyalkylene-based polymer is preferably a polymer that has a crosslinkable silyl group in the molecule and a polyoxyalkylene in the main chain skeleton, and more preferably a polymer that has polyoxyalkylene in the main chain skeleton and a crosslinkable silyl group at the terminal of the main chain. The polyoxyalkylene is preferably oxypropylene.

The crosslinkable silyl group-containing acrylic-modified polyoxyalkylene-based polymer is preferably a polymer that has a crosslinkable silyl group in the molecule and a (meth)acrylic-modified polyoxyalkylene in the main chain skeleton, and more preferably a polymer that has (meth) acrylic-modified polyoxyalkylene in the main chain skeleton and a crosslinkable silyl group at the terminal of the main chain. The (meth)acryl-modified polyoxyalkylene is preferably (meth)acryl-modified polyoxypropylene.

Examples of the crosslinkable silyl group-containing acrylic-based polymer includes a polymer that has an acrylic-based polymer in the main chain skeleton and one or more crosslinkable silyl groups in the molecule. The acrylic-based polymer used herein can be a conventionally known one, and is, but not particularly limited to, an acrylic-based polymer produced by polymerizing or copolymerizing one or more acrylic monomers selected from the group consisting of (meth)acrylic acid, (meth)acrylate, (meta)acrylonitrile and (meth)acrylamide. The acrylic-based polymer includes preferably a (meth)acrylate polymer that comprises (meth) acrylate monomer as a main component (in the amount of, for example, 50% by mass or more, preferably 70% by mass or more based on the amount of the polymer) and that has 1 to 20 carbon atoms in the ester moiety thereof.

The acrylic-based polymer may have a monomer other than the above acrylic monomer copolymerizable with the acrylic monomer copolymerized therewith. Examples of the copolymerizable monomer include vinyl-based monomers such as fluoroolefins, α-olefins, vinyl esters and vinyl ethers.

The number-average molecular weight of the modified silicone is, but not limited to, for example, 5,000 to 100,000 preferably 10,000 to 50,000. The number-average molecular weight is the value determined in terms of polystyrene by GPC method.

The modified silicone to be used can be a commercially available product, for example, the crosslinkable silyl group-containing polyoxyethylene-based polymers manufactured by KANEKA CORPORATION, "MS Polymer S203" and "MS Polymer S303".

In addition to the above, a crosslinkable silyl group-containing silicone resin may be used as a crosslinkable silyl group-containing polymer. The crosslinkable silyl group-containing silicone resin is a polymer that has a polyorganosiloxane in the main chain and a crosslinkable silyl group at the terminal thereof. The crosslinkable silyl group-containing silicone resin to be used can include "Sekisui Silicone Sealant" manufactured by Sekisui Fuller Company, Ltd.

Two-Liquid Curable Adhesive Base

The two-liquid curable adhesive base is an adhesive base that cures by mixing two liquids. According to the present invention, the use of a two-liquid curable adhesive base as an adhesive base enables the thermally expandable fire-resistant material composition to be of two-liquid curable type. When the two-liquid curable adhesive base is used as an adhesive base, the thermally expandable fire-resistant material can be relatively high in adhesive strength. It can also easily improve the adhesion to an object to be applied not only before combustion but also after combustion. In addition, it enables the cure time to be easily controlled by appropriately changing the adhesive base to be used. Furthermore, it can prevent the thermally expandable fire-resistant material from sagging caused by heating after the application.

The two-liquid curable adhesive base is composed of a base resin and a curing agent, which are preferably stored separately until just before use. Therefore, when the two-liquid curable adhesive base is used, the components other than the two-liquid curable adhesive base are preferably preblended in either the base resin or the curing agent. Then, Liquid 1 comprising the base resin and Liquid 2 comprising the curing agent are preferably mixed just before use to provide a thermally expandable fire-resistant material composition.

The two-liquid curable adhesive base to be used should be generally a resin used for two-liquid curable adhesives, and includes a polyurethane-based resin, an epoxy-based resin and an acrylic-based resin, and among them, an epoxy-based resin is preferred. For the epoxy-based resin, an epoxy-based compound having an epoxy group should be used as a base resin, and a curing agent curing the epoxy group as a curing agent. The curing agent to be used can be any known curing agent, and can include a polyamine-based curing agent, an imidazole-based curing agent, a polymercaptan-based curing agent and an acid anhydride-based curing agent.

The epoxy-based resin to be used can be a commercially available product, for example, "S-dine 3120" manufactured by Sekisui Fuller Company, Ltd.

Emulsion-Type Adhesive Base

The emulsion-type adhesive base in a thermally expandable fire-resistant material composition is dispersed in a dispersion medium, preferably water. According to the present invention, the use of the emulsion-type adhesive base as an adhesive base enables the thermally expandable fire-resistant material composition to be an emulsion dispersion and to be of emulsion type. The emulsion-type thermally expandable fire-resistant material composition can be solidified by volatilizing the dispersion medium.

The use of emulsion-type adhesive base makes it easier to have a large amount of the thermally expandable compound blended therein, which easily improves the fire-resistant performance. In addition, environmental load can be suppressed. Furthermore, the residual hardness and expansion ratio can be increased in a balanced manner.

Examples of the emulsion-type adhesive base to be used can include a vinyl acetate resin-based, an ethylene-vinyl acetate resin-based, an acrylic resin-based and aqueous polymer-isocyanate resin-based adhesive base. Among these, the ethylene-vinyl acetate resin is preferred. The ethylene-vinyl acetate resin to be used as an adhesive base should be an ethylene-vinyl acetate-based copolymer resin. The emulsion-type adhesive base to be used can be a commercially available product, such as "S-dine K-474", an ethylene-vinyl acetate resin manufactured by Sekisui Fuller Company, Ltd.

Solvent-Based Adhesive Base

In a thermally expandable fire-resistant material composition, the solvent-based adhesive base is dissolved in an organic solvent. According to the present invention, the use of the solvent-based adhesive base as an adhesive base enables the thermally expandable fire-resistant material composition to comprises an organic solvent and have the solvent-based adhesive base dissolved in the organic solvent, and to be solvent-based. The solvent-based thermally expandable fire-resistant material composition can be solidified by volatilizing the dispersion medium.

The use of the solvent-based adhesive base makes it easier to have a large amount of the thermally expandable compound blended therein, which easily improves the fire-resistant performance. In addition, the residual hardness and expansion ratio may be increased in a balanced manner. Furthermore, the adhesion to an object to be applied can be improved and good adhesion to an object to be applied is easily maintain well not only before combustion but also after combustion.

Examples of the solvent-based adhesive base include a vinyl acetate resin-based, a chloroprene rubber-based and an acrylic resin-based adhesive base. Among these, a chloroprene rubber-based adhesive base and an acrylic resin-based adhesive base are preferred. The chloroprene rubber-based adhesive base to be used may be any chloroprene rubber conventionally used for solvent-based adhesives. The acrylic resin-based adhesive base to be used may be any acrylic resin conventionally used for solvent-based adhesives. According to the present invention, the use of the chloroprene rubber as a solvent-based adhesive base can increase the residual hardness and expansion ratio in a balanced manner. When the acrylic resin-based adhesive base is used, the adhesion to an object to be applied is easily maintain well not only before combustion but also after combustion.

The solvent-based adhesive base to be used can be a commercially available product, such as "S-dine 235L", a chloroprene rubber manufactured by Sekisui Fuller Company, Ltd., or "S-dine 7858", an acrylic resin, manufactured by Sekisui Fuller Company, Ltd.

When the adhesive base other than a hot-melt-based adhesive base is used (that is, for example, any adhesive base other than a hot-melt-based adhesive base is used as a main component and the thermally expandable fire-resistant material composition is any one of one-liquid curable type, two-liquid curable type, emulsion type or solvent type), the viscosity at an ordinary temperature (23° C.) of the thermally expandable fire-resistant material composition is preferably 500,000 mPa·s or less, more preferably 300,000 mPa·s or less, still more preferably 200,000 mPa·s or less, and even more preferably 150,000 mPa·s or less. When the thermally expandable fire-resistant material composition has the viscosity at 23° C. of no more than these upper limits, it can be improved in applicability, for example, the object to be applied can be coated therewith with good coatability.

The viscosity at an ordinary temperature of the thermally expandable fire-resistant material composition is not particularly limited, but is preferably 400 mPa·s or more, more preferably 4,000 mPa·s or more, and still more preferably 10,000 mPa·s or more, from the viewpoint of preventing dripping when coating the composition.

The content of the adhesive base in the thermally expandable fire-resistant material composition of the present invention is preferably 10 to 80% by mass based on the solid content of the thermally expandable fire-resistant material composition. When the content of the adhesive base is 10% by mass or more, the thermally expandable fire-resistant material obtained by solidifying or curing the thermally expandable fire-resistant material composition can be improved in adhesion to an object to be applied. When the content of the adhesive base is 80% by mass or less, the thermally expandable fire-resistant material composition can comprise a component, other than the adhesive base, such as a thermally expandable compound in a certain amount or more and it can be improved in various performances such as fire-resistant performance. From these viewpoints, the content of the adhesive base in the thermally expandable fire-resistant material composition is more preferably 15% by mass or more, still more preferably 20% by mass or more, even more preferably 70% by mass or less, and further more preferably 60% by mass or less.

Each of the above-described hot-melt adhesive base, one-liquid curable adhesive base, two-liquid curable adhesive base, emulsion-type adhesive base and solvent-based adhesive base can be preferably used alone in the thermally expandable fire-resistant material composition. For example, when the adhesive base comprises a hot-melt adhesive base, the hot-melt adhesive base should be used alone as an adhesive base. The same applies to other adhesive bases.

However, the above adhesive bases may be used in combination of two or more thereof. For example, the thermally expandable fire-resistant material composition may comprise an adhesive base other than the hot-melt adhesive base in addition to the hot-melt adhesive base, for example, it may comprise a one-liquid curable adhesive base in addition to the hot-melt adhesive base. Even in such a case, if the thermally expandable fire-resistant material composition is used as a hot-melt type thermally expandable fire-resistant material composition, the hot-melt adhesive base should be a main component.

Therefore, even if the hot-melt type thermally expandable fire-resistant material composition comprises the other adhesive base, the content of the hot-melt adhesive base is preferably higher than the content of the other adhesive base, and it is, for example, 50 to 100% by mass, preferably 75 to 100% by mass and more preferably 85 to 100% by mass, based on the total amount of the adhesive base.

When the thermally expandable fire-resistant material composition comprises a hot-melt adhesive base and a one-liquid curable adhesive base and it is used as a one-liquid curable type thermally expandable fire-resistant material composition, the one-liquid curable adhesive base should be a main component. In that case, the content of the one-liquid curable adhesive base is preferably higher than the content of the other adhesive base, and it is, for example, 50 to 100% by mass, preferably 60 to 100% by mass and more preferably 70 to 100% by mass, based on the total amount of the adhesive base.

It is to be understood that different types of adhesive bases may be in combination, for example, a one-liquid curable adhesive base and a solvent-based adhesive base may be used in combination.

Inorganic Filler

The thermally expandable fire-resistant material composition of the present invention may comprise an inorganic filler other than the thermally expandable compounds described above. The inorganic filler, when heated to form an expansion heat insulating layer, increases the heat capacity and suppresses the heat transfer, while acting acts like an aggregate to improve the strength of expansion residues.

Examples of the organic filler that can be used in the present invention include, but is not particularly limited to, a metal oxide such as alumina, zinc oxide, titanium oxide, calcium oxide, magnesium oxide, iron oxides, tin oxide, antimonic oxide or ferrite; a metal carbonate such as calcium carbonate, zinc carbonate, strontium carbonate or barium carbonate; a metal hydroxide such as calcium hydroxide, magnesium hydroxide, aluminum hydroxide or hydrotalcite; a calcium salt such as calcium sulfate, gypsum fiber or calcium silicate; silica, diatomaceous earth, dawsonite, barium sulfate, talc, clay, mica, montmorillonite, bentonite, activated soil, sepiolite, imogolite, sericite, glass fiber, glass bead, silica-based balloon, aluminum nitride, boron nitride, silicon nitride, carbon black, graphite, carbon fiber, carbon balloon, various metal powders, potassium titanate, magnesium sulfate, lead zirconate titanate, aluminum borate, molybdenum sulfide, silicon carbide, stainless steel fiber, zinc borate, various magnetic powders, slag fiber, fly ash; a metal phosphate such as sodium phosphate, potassium phosphate, magnesium phosphate or aluminum phosphate; a metal orthophosphate, a metal metaphosphate, and a metal tripolyphosphate. The inorganic filler may be used alone or in combination of two or more thereof. Among these, from the viewpoint of improving fire-resistant performance of the thermally expandable fire-resistant material, calcium carbonate, barium sulfate and aluminum hydroxide are preferred and calcium carbonate is more preferred. The inorganic fillers may be used alone or in combination of two or more thereof.

Calcium carbonate is particularly preferably used in combination of ammonium polyphosphate. Using these in combination makes it easier to increase the residue hardness.

When the thermally expandable fire-resistant material composition comprises an inorganic filler, the content is preferably 1 to 50% by mass, more preferably 5 to 45% by mass, and still more preferably 10 to 40% by mass, based on the total solid content of the thermally expandable fire-resistant material composition.

Other Components

The thermally expandable fire-resistant material composition of the present invention may comprise a plasticizer. The thermally expandable fire-resistant material composition comprising the plasticizer can be reduced in viscosity and be improved in coatability and applicability. The plasticizer is not particularly limited, but it is suitably used when a modified silicone is used as an adhesive base. Examples of the plasticizer include a polyether-based plasticizer such as a polyalkylene oxide. The content of the plasticizer is, for example, 1 to 100 parts by mass, preferably 10 to 80 parts by mass and more preferably 20 to 75 parts by mass, based on 100 parts by mass of the adhesive base.

The thermally expandable fire-resistant material composition of the present invention may comprise a flame retardant filler other than the expandable flame retardants described above. Such flame retardants include a phosphate ester compound. Examples of the phosphate ester compound include trimethyl phosphate, triethyl phosphate, tributyl phosphate, trioctyl phosphate, octyl diphenyl phosphate, tributoxyethyl phosphate, trichloroethyl phosphate, tris(2-chloropropyl) phosphate, tris(2,3-dichloropropyl) phosphate, tris(2,3-dibromopropyl) phosphate, tris(bromochloropropyl) phosphate, bis(2,3-dibromopropyl)-2,3-dichloropropyl phosphate, bis(chloropropyl) monooctyl phosphate, tris(2-ethylhexyl) phosphate, triphenyl phosphate, tricresyl phosphate (TCP), trixylenyl phosphate, cresyl diphenyl phosphate and xylenyl diphenyl phosphate.

The thermally expandable fire-resistant material composition of the present invention may further comprise a catalyst, a polymerization initiator, or the like. When the thermally expandable fire-resistant material composition is curable, such as a one-liquid curable type thermally expandable fire-resistant material composition or a two-liquid curable type thermally expandable fire-resistant material composition, the catalyst can be suitably used as a curing catalyst. The thermally expandable fire-resistant material composition of the present invention comprising the curing catalyst can promote a curing reaction.

When a modified silicone is used, for example, the curing catalyst to be used can be a titanium-based catalyst, a tin-based catalyst, a zirconium-based catalyst, an aluminum-based catalyst or a bismuth-based catalyst and among these, a tin-based catalysts are preferred.

The content of the catalyst in the thermally expandable fire-resistant material composition is, but not particularly limited, about 0.1 to 15 parts by mass with respect to 100 parts by mass of the adhesive base.

Examples of the polymerization initiator include an organic peroxide such as dicumyl peroxide and an azo compound. The content of the polymerization initiator is, for example, about 0.1 to 15 parts by mass with respect to 100 parts by mass of the adhesive base. The polymerization initiator is preferably blended when a hot-melt-based adhesive base is used, for example, from the viewpoint of maintaining the shape of the thermally expandable fire-resistant material without collapsing when expanded.

In addition, the thermally expandable fire-resistant material composition of the present invention can comprise additives other than those described above, as necessary, as long as the object of the present invention is not impaired. Examples of such additives include a lubricant, an anti-shrinking agent, a crystal nucleating agent, a coloring agent (a pigment, a dye or the like), an ultraviolet absorber, an antioxidant, an anti-aging agent, a fire aid, an antistatic agent, a surfactant, a vulcanizing agent, a dispersant, and a surface treatment agent. The additives may be used alone or in combination of two or more thereof.

The solvent-based thermally expandable fire-resistant material composition preferably comprises an organic solvent for dissolving the adhesive base, and the emulsion-type thermally expandable fire-resistant material composition preferably comprises a dispersion medium such as water for dispersing the adhesive base.

Method for Producing Thermally Expandable Fire-Resistant Material Composition The thermally expandable fire-resistant material composition of the present invention can be obtained by mixing an adhesive base, a thermally expandable compound, and optionally an inorganic filler and other components which are blended therewith as necessary.

The emulsion type-thermally expandable fire-resistant material composition or solvent-based thermally expandable fire-resistant material composition is preferably produced by adding a thermally expandable compound and optionally other components, which are blended therewith as necessary, to an organic solvent having the adhesive base previously dissolved therein or a dispersion medium having the adhesive base previously dispersed therein, and then mixing them.

For the two-liquid curable type-thermally expandable fire-resistant material composition, a base resin and a curing agent may be prepared as components of an adhesive base, and a thermally expandable compound may be added to at least one of the base resin and the curing agent to provide Liquid 1 and Liquid 2. In this case, Liquid 1 and Liquid 2 is preferably mixed together to prepare a thermally expandable fire-resistant material composition.

Thermally Expandable Fire-Resistant Material

The thermally expandable fire-resistant material of the present invention is obtained by solidifying or curing the thermally expandable fire-resistant material composition described above. The thermally expandable fire-resistant material of the present invention is preferably obtained by solidifying or curing the above-described thermally expandable fire-resistant material composition coated on an object to be applied, and it is preferably formed into a film on the object to be applied. The thickness of the thermally expandable fire-resistant material that is formed into a film on the object to be applied is, but not particularly limited, 0.1 to 20 mm, preferably 0.3 to 10 mm, more preferably 0.5 to 5 mm.

Alternatively, the thermally expandable fire-resistant material may be obtained by filling gaps in the object to be applied with the thermally expandable fire-resistant material composition, and then solidifying or curing the filled thermally expandable fire-resistant material composition. Examples of the object to be applied include a member having a hollow area inside, such as a square pipe or a sash frame. The hollow area is preferably filled with the thermally expandable fire-resistant material composition. The size of the thermally expandable fire-resistant material obtained by filling the gaps in the object to be applied with the thermally expandable fire-resistant material composition is not particularly limited, and is preferably depending on the gaps.

The thermally expandable fire-resistant material of the present invention preferably has a volume expansion ratio of 10 times or more when heated at 600° C. for 10 minutes, and a residue hardness of 0.1 kgf/cm$^2$ or more. The thermally expandable fire-resistant material, which has a volume expansion ratio and residue hardness of the above lower limits or more, can have good fire-resistant performance. The volume expansion ratio is more preferably 20 times or more and still more preferably 30 times or more. The upper limit of the volume expansion ratio is not particularly limited, but it is, for example, 150 times and preferably 100 times, from the viewpoint of making the expansion residue hardness equal to or higher than a certain value.

The residue hardness is more preferably 0.15 kgf/cm$^2$ or more and more preferably 0.25 kgf/cm$^2$ or more, and the upper limit of the residue hardness is, but not particularly limited, for example, 1.5 kgf/cm$^2$.

The volume expansion ratio and residue hardness can be measured by the measurement methods described in the Examples below, respectively.

Method for Producing Thermally Expandable Fire-Resistant Material

The thermally expandable fire-resistant material of the present invention can be produced by coating an object to be applied with the above thermally expandable fire-resistant material composition and then solidifying or curing the thermally expandable fire-resistant material with which the object to be applied has been coated.

The process of coating an object to be applied with the above thermally expandable is not particularly limited, but includes a process of coating the object to be applied by using a brush or any known coating device, and a process of coating the object to be applied by spraying.

Alternatively, the thermally expandable fire-resistant material of the present invention is produced by filling the gaps of the object to be applied with the thermally expandable fire-resistant material and then solidifying or curing the thermally expandable fire-resistant material composition with which the object to be applied has been filled.

According to the present production method, when the thermally expandable fire-resistant material composition comprises a hot-melt adhesive base and it is a hot-melt type thermally expandable fire-resistant material composition, the thermally expandable fire-resistant material composition is preferably melted by heating, and an objected to be applied should be coated or filled with the molten thermally expandable fire-resistant material composition.

The thermally expandable fire-resistant material composition is preferably heated to a temperature not higher than the expansion onset temperature of the thermally expandable compound when melted and the heating temperature is, for example, 100 to 160° C. and preferably 120 to 155° C. The expansion onset temperature of the thermally expandable compound as used herein means the expansion onset temperature of the thermally expandable compound having the lowest expansion onset temperature when two or more thermally expandable compounds are used.

According to the present production method, the process for solidifying or curing the thermally expandable fire-resistant material composition with which the object to be applied is coated or filled is not particularly limited. According to the present invention, when the adhesive base described above is used, the thermally expandable fire-resistant material composition can be solidified or cured even by allowing it to stand near an ordinary temperature (such as about 0 to 40° C.) in the atmosphere.

However, the thermally expandable fire-resistant material composition with which the object to be applied has been coated or filled may be heated or the like, if necessary. For example, when the adhesive base is either an emulsion-type adhesive base or a solvent-based adhesive base, the solidification of the thermally expandable fire-resistant material composition may be promoted by heating it to volatilize the organic solvent or water. When the adhesive base is a two-liquid curable adhesive base, the thermally expandable fire-resistant material composition may be heated to promote curing.

Uses

The thermally expandable fire-resistant material composition and thermally expandable fire-resistant material of the present invention can be used in various buildings such as detached houses, collective housings, high-rise housings, high-rise buildings, commercial facilities and public facilities; various vehicles such as automobiles and trains; ships, aircraft, and electronic devices.

For the buildings, for example, the thermally expandable fire-resistant material composition is applied by coating on fittings such as windows, Shojis, doors, sliding doors and Fusumas, and construction materials other than fittings, such as walls, beams, pillars, floors, bricks, roofs, plate materials, piping and wiring. For the fittings, for example, the thermally expandable fire-resistant material composition can be coated on the sash and solidified and cured to provide a fire sash having a thermally expandable fire-resistant material coated.

For the buildings, the thermally expandable fire-resistant material composition can be also used as a fire-resistant filler or a fire-resistant watertight filler by filling gaps formed in walls, ceilings, floors or the like. More specifically, it may be used as a fire-resistant filler, a fire-resistant watertight filler or the like to fill gaps in penetrating parts (such as section penetrating parts) for penetrating pipes and wiring provided in walls, ceilings, floors or the like. Alternatively, the thermally expandable fire-resistant material composition can be filled inside frame materials such as sash frames that make up fittings, inside square pipes or the like that make up pillars, beams or the like, and solidified or cured to provide fittings, pillars, beams or the like and the like having the thermally expandable fire-resistant material filled.

The thermally expandable fire-resistant material composition can be also used as a fire-resistant joint filler by coating it on the outer walls or the like of buildings or filling the gaps between the outer walls.

For a battery case, an electronic device such as a smartphone or the like, the thermally expandable fire-resistant material composition of the present invention can be used by coating it on the surface of the battery case such as that for a lithium-ion battery, a cover material of the electronic device or the like, or by filling it into the gaps of the battery case or the gaps in the electric device or the like. When the thermally expandable fire-resistant material composition of the present invention is used in the electronic device, it can prevent fires from occurring even if a battery such as a lithium-ion battery exhibits thermal runaway.

The thermally expandable fire-resistant material composition of the present invention can also be used as an adhesive and may be used to cause each of parts to adhere to each other in various buildings, various vehicles such as automobiles and trains, ships, aircraft, electronic devices or the like. It may also be used as a packing for providing a sealing between parts in various buildings, various vehicles such as trains and automobiles, ships, aircraft, electronic devices or the like. In particular, when used as an adhesive, packing or the like around a battery such as a lithium-ion battery in an electric vehicle or an electronic device such as a smartphone, it can suppress fires that would occur when the battery such as a lithium-ion battery would exhibit thermal runaway, so that it is effective. For the ships, it may be used as an adhesive, a watertight material or the like for parts of the ships that are regulated for fire protection.

Examples

Hereinafter, the present invention will be described more specifically with reference to examples, but the present invention is not limited thereto.

Components used in Examples and Comparative Examples are as follows.

Adhesive Base

- EVA: an ethylene-vinyl acetate copolymer resin, a hot-melt adhesive base, "Ultrasen 726", manufactured by Tosoh Corporation; vinyl acetate content: 33% by mass; melt flow rate: 700 g/10 min (190° C., load: 21.2 N)
- EMMA: an ethylene-methyl methacrylate copolymer, a hot-melt adhesive base, "ACRYFT CM5021", manufactured by SUMITOMO CHEMICAL COMPANY, LIMITED; MMA (methyl methacrylate) content: 28% by mass; melt flow rate: 450 g/10 min (190° C., load: 21.2 N)
- Modified silicone: a one-liquid curable adhesive base, "MS Polymer S303", manufactured by KANEKA CORPORATION; a polyalkylene oxide which comprises a polypropylene oxide as a main chain skeleton and a propyldimethoxysilyl group at the terminal of the main chain; number-average molecular weight: 20,000
- EVA emulsion: an emulsion-type adhesive base, "S-dine K-474", manufactured by Sekisui Fuller Company, Ltd.; a water-based adhesive which mainly comprises an ethylene-vinyl acetate copolymer resin; solid content: 40% by mass
- CR rubber, solvent-based: a solvent-based adhesive base, "S-dine 235L", manufactured by Sekisui Fuller Company, Ltd.; a solvent-based adhesive which mainly comprises chloroprene rubber; solid content: 23% by mass
- Acrylic, solvent-based: a solvent-based adhesive base, "S-dine 7858", manufactured by Sekisui Fuller Company, Ltd.; a solvent-based adhesive which mainly comprises an acrylic resin; solid content 45% by mass
- Epoxy based: a two-liquid curable adhesive base, "S-dine 3120", manufactured by Sekisui Fuller Company, Ltd.; an adhesive base which comprises a base resin containing an epoxy compound and a curing agent containing a polyamine
- Silicone resin: a one-liquid curable adhesive base, "Sekisui Silicone Sealant", manufactured by Sekisui Fuller Company, Ltd.; a silicone resin having a ketoxime silyl group

Tackifying Resin

- C9 non-hydrogenated: a non-hydrogenated C9 petroleum resin (an aromatic petroleum resin), "Petcol 120", manufactured by Tosoh Corporation; glass transition temperature (Tg): 120° C.; softening point: 120° C.

Rosin: a rosin ester, “Super Ester A-125”, manufactured by ARAKAWA CHEMICAL INDUSTRIES, LTD.; glass transition temperature (Tg): 115° C.; softening point: 125° C.

Non-Adhesive Base

Polyethylene: “L405”, manufactured by SUMITOMO CHEMICAL COMPANY, LIMITED

Thermally Expandable Compound

Thermally Expandable Graphite

Thermally expandable graphite 1: “ADT351”, manufactured by ADT Co., Ltd.

Thermally expandable graphite 2: “EXP50S150”, manufactured by Fuji Graphite Works Co., Ltd.

Thermally expandable graphite 3: “EXP50S160”, manufactured by Fuji Graphite Works Co., Ltd.

Thermally expandable graphite 4: “EXP42S160”, manufactured by Fuji Graphite Works Co., Ltd.

Expandable Flame Retardant aluminum phosphite: “APA100”, manufactured by Taihei Chemical Industrial Co., Ltd.

Ammonium polyphosphate 1: “AP422”, manufactured by Clariant AG

Ammonium polyphosphate 2: “AP462”, manufactured by Clariant AG

Inorganic Filler

Calcium carbonate: “BF300”, manufactured by Bihoku Funka Kogyo Co., Ltd.

Other Components

Polymerization initiator: “PERCIMYL D40”, manufactured by NOF Corporation

Plasticizer: “EXCENOL 3020”, a polyether plasticizer (polyalkylene oxide), manufactured by AGC Inc.

Catalyst: a dibutyltin-based compound, “NEOSTANN U220H”, manufactured by Nitto Kasei Co., Ltd.

Examples 1 to 8 and 16

According to the formulation shown in Table 1, components of each Example were uniformly heated and melt-kneaded at 130° C. to obtain a hot-melt type thermally expandable fire-resistant composition.

Examples 9, 10, 15, 17 and 18

According to the formulation shown in Table 1, components of each Example were mixed under vacuum atmosphere for 60 minutes until uniform by using a planetary mixer to obtain a one-liquid curable type thermally expandable fire-resistant material composition.

Example 11

According to the formulation shown in Table 1, components other than the adhesive base were added to the EVA emulsion dispersion containing the adhesive base (S-dine K-474) and mixed at an ordinary temperature to obtain a thermally expandable fire-resistant composition.

Example 12

According to the formulation shown in Table 1, components other than the adhesive base were added to the CR rubber solution containing the adhesive base (S-dine 235L) and mixed at an ordinary temperature to obtain a thermally expandable fire-resistant composition.

Example 13

According to the formulation shown in Table 1, components other than the adhesive base were added to the acrylic resin solution containing the adhesive base (S-dine 7858) and mixed at an ordinary temperature to obtain a thermally expandable fire-resistant composition.

Example 14

Components other than the adhesive base were mixed with the base resin of “S-dine 3120” containing an epoxy compound to prepare Liquid 1, and the curing agent of “S-dine 3120” was designated as Liquid 2. Liquid 1 and Liquid 2 were mixed just before the measurement and evaluation of each of physical properties to provide a thermally expandable fire-resistant composition.

Comparative Example 1

According to the formulation shown in Table 1, components were uniformly heated and melt-kneaded with a twin-roll at 120° C. and were subjected to press molding to obtain a thermally expandable fire-resistant material composition having a thickness of 1.5 mm.

The measurement method and evaluation method for each of physical properties are as follows.

Evaluation Method

Expansion Onset Temperature of Thermally Expandable Graphite

A 100 mg portion of the thermally expandable graphite was taken as a sample, and was heated at a heating rate of 10° C./min with a rheometer (“Discovery HR2”, manufactured by TA Instruments). The temperature at which the normal direction force began to rise was measured and was taken as an expansion onset temperature.

Viscosity

The melt viscosity at 150° C. of the hot-melt type thermally expandable fire-resistant composition was measured with a Brookfield RVT viscometer (spindle No. 29). The viscosity of the thermally expandable fire-resistant material composition other than that of the hot-melt type thermally expandable fire-resistant composition was measured at an ordinary temperature (23° C.) and at 5 rpm with an H-type viscometer.

Fire-Resistant Performance Test

A thermally expandable fire-resistant material composition obtained in each Example was coated in a 30 mm square on a 98 mm square iron plate, and was solidified or cured by allowing it to stand at an ordinary temperature in the atmosphere for the solidification or curing time described later in each Example to form a thermally expandable fire-resistant material having a thickness of about 1.5 mm on the iron plate. The temperature of the thermally expandable fire-resistant material composition during coating was 150° C. for Examples 1 to 8 and 16, and 23° C. for Examples 9 to 15, 17 and 18. In Comparative Example 1, as the thermally expandable fire-resistant material composition did not fluidize even when heated to the expansion onset temperature of the thermally expandable graphite, the thermally expandable fire-resistant material composition in a sheet form was adhered to the iron plate by thermocompression bonding at a temperature of 130° C.

The iron plate having the thermally expandable fire-resistant material formed thereon was placed in an electric furnace preheated to 600° C. and was subjected to combustion by heating for 10 minutes and taken out thereafter. The expansion ratio was calculated according to the following equation:

Expansion ratio=Volume of expansion residues after combustion/Volume of thermally expandable fire-resistant material before combustion.

The expansion residues were subjected to compression from the top surface thereof at a rate of 0.1 cm/sec with an indenter (a three-point indenter with a diameter of 1 mm) by using a compression tester ("Finger Filling Tester", manufactured by KATO TECH CO., LTD.). The maximum compressive load was read at a compression depth of 0 to 8 mm and was taken as residue hardness.

Adhesion to Substrate

Both of the iron plate having the thermally expandable fire-resistant material formed thereon before subjected to combustion by heating and the iron plate having the expansion residues thereon after heating (at 600° C.) were tilted. If the thermally expandable fire-resistant material or the expansion residues did not fall off and was stuck to the iron plate, it was rated as "A", and if the thermally expandable fire-resistant material or the expansion residues fell off, it was rated as "B".

In addition, an iron plate having the thermally expandable fire-resistant material formed thereon was placed in an electric furnace that had been previously kept at 500° C. and was subjected to combustion by heating for 10 minutes and taken out thereafter and evaluated in the same manner.

Adhesive Strength

Two pieces of SUS plate specified in accordance with JIS G4303 were provided. Each piece of SUS plate had a planar rectangular shape of 12 mm in length, 50 mm in width and 4.0 mm in thickness. A thermally expandable fire-resistant material composition was coated on one of the surface of a piece of SUS plate, and the other piece of SUS plate was superimposed on the surface of the piece of SUS plate having the thermally expandable fire-resistant material composition coated thereon to prepare a laminate. The thermally expandable fire-resistant material composition was coated on an aluminum alloy plate so that the coating width (vertical direction) was 12 mm, the coating length (horizontal direction) was 10 mm and the coating thickness was 0.3 mm. The temperature of the thermally expandable fire-resistant material composition of each Example during coating was the same as in the fire-resistant performance test described above.

The laminate was left in an atmosphere of 23° C. and 50% RH for 7 days, and two pieces of SUS plate were allowed to adhere and integrate via the resulting thermally expandable fire-resistant material to prepare a test specimen.

The resulting test specimen was subjected to a tensile test by pulling it at a rate of 5 mm/min in the shear direction with a universal tensile tester (manufactured by Instron), and the tensile shear strength was measured at the time when the thermally expandable fire-resistant material constituting the test specimen was broken.

Curing or Solidification Time

The thermally expandable fire-resistant material composition was coated on a metal with a coating thickness of 2 mm in an atmosphere of 23° C. and 50% RH. The surface of the composition was touched with a metal spatula immediately after coating (after 1 second) and every 5 minutes after coating, and the time until the coated thermally expandable fire-resistant material composition no longer attached to the spatula was measured and taken as a curing or solidification time.

Sagging

In the same manner as in the fire-resistant performance test, a thermally expandable fire-resistant material composition was coated on a galvanized steel plate with 75 mm square 0.5 mm in thickness in an about 30 mm square, and then cured or solidified to form a thermally expandable fire-resistant material having a thickness of about 1.5 mm. The galvanized steel plate having the thermally expandable fire-resistant material formed thereon was heated at 200° C. for 10 minutes while kept upright. The condition of the thermally expandable fire-resistant material at that time was evaluated for sagging according to the following evaluation criteria:

A: Sagging of less than 0.5 mm occurred

B: Sagging of 0.5 mm or more occurred

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Formulation (parts by mass) | | | | | | | | | | | |
| Adhesive base | EVA | 100 | 100 | 100 | 100 | 100 | | 100 | 82 | | |
| | EMMA | | | | | | 100 | | | | |
| | Modified silicone | | | | | | | | 18 | 100 | 100 |
| | EVA emulsion | | | | | | | | | | |

TABLE 1-continued

| | | | | | | | | | | | |
|---|---|---|---|---|---|---|---|---|---|---|---|
| | CR rubber, solvent-based | | | | | | | | | | |
| | Acrylic, solvent-based | | | | | | | | | | |
| | Epoxy-based | | | | | | | | | | |
| | Silicone resin | | | | | | | | | | |
| Tackifying resin (Adhesive base) | C9 non-hydrogenated | 76 | 76 | 76 | 76 | 76 | 76 | | 76 | | |
| | Rosin | | | | | | | 76 | | | |
| Non-adhesive base | Polyethylene | | | | | | | | | | |
| Thermally expandable graphite (thermally expandable compound) | Thermally expandable graphite 1 | 44 | 62 | 79 | 97 | | 62 | 62 | 62 | | |
| | Thermally expandable graphite 2 | | | | | 62 | | | | | |
| | Thermally expandable graphite 3 | 18 | | | | | | | | | |
| | Thermally expandable graphite 4 | | | | | | | | | 50 | 67 |
| Expandable flame retardant (thermally expandable compound) | Aluminum phosphite | 88 | 88 | 105 | 88 | 88 | 88 | 88 | 88 | | |
| | Ammonium polyphosphate 1 | | | | | | | | | 73 | |
| | Ammonium polyphosphate 2 | | | | | | | | | | 76 |
| Inorganic filler | Calcium carbonate | | | | | | | | | 159 | 162 |
| Others | Polymerization initiator | 5 | | 5 | | | | | | | |
| | Plasticizer | | | | | | | | | 59 | 62 |
| | Catalyst | | | | | | | | | 2 | 2 |
| Total | | 330 | 325 | 366 | 360 | 325 | 325 | 325 | 326 | 443 | 469 |
| Content percentage of adhesive base (% by mass) | Base resin | 30% | 31% | 27% | 28% | 31% | 31% | 31% | 31% | 23% | 21% |
| | Tackifying resin | 23% | 23% | 21% | 21% | 23% | 23% | 23% | 23% | 0% | 0% |
| | Total | 53% | 54% | 48% | 49% | 54% | 54% | 54% | 54% | 23% | 21% |
| Content percentage of thermally expandable compound (% by mass | Thermally expandable graphite | 19% | 19% | 22% | 27% | 19% | 19% | 19% | 19% | 11% | 14% |
| | Expandable flame retardant | 27% | 27% | 29% | 24% | 27% | 27% | 27% | 27% | 16% | 16% |
| | Total | 45% | 46% | 50% | 51% | 46% | 46% | 46% | 46% | 28% | 30% |
| Expandable flame retardant thermally expandable graphite (mass ratio) | | 1.43 | 1.43 | 1.33 | 0.91 | 1.43 | 1.43 | 1.43 | 1.43 | 1.45 | 1.14 |
| Content percentage of inorganic filler (% by mass) | | | | | | | | | | 36% | 35% |
| Expansion onset temperature of thermally expandable graphite (° C.) | | 175 | 180 | 180 | 180 | 150 | 180 | 180 | 180 | 160 | 160 |
| Viscosity(mPa · s) | | 66,000 | 58,000 | 125,000 | 117,000 | 58,000 | 60,000 | 58,000 | 56,000 | 300,000 | 300,000 |
| Fire-resistant performance (600° C., 10 minutes) | Volume expansion ratio (times) | 64 | 62 | 70 | 85 | 52 | 58 | 66 | 67 | 43 | 41.4 |
| | Residual hardness ($kgf/cm^2$) | 0.2 | 0.3 | 0.2 | 0.1 | 0.4 | 0.2 | 0.3 | 0.2 | 1.1 | 0.89 |

TABLE 1-continued

| | | | | | | | | | | | |
|---|---|---|---|---|---|---|---|---|---|---|---|
| Adhesion to substrate | Before combustion | A | A | A | A | A | A | A | A | A | A |
| | After combustion (600° C.) | A | A | A | A | A | A | A | A | B | B |
| | After combustion (500° C.) | A | A | A | A | A | A | A | A | A | A |
| Adhesion strength SUS-SUS (MPa) | | 1.8 | 1.8 | 1.8 | 1.8 | 1.8 | 1.8 | 1.8 | 1.8 | 0.8 | 0.8 |
| Curing or solidification time | | 1 second | 1 second | 1 second | 1 second | 1 second | 1 second | 1 second | 1 second | 30 minutes | 30 minutes |
| Sagging (200° C., 10 minutes) | | B | B | B | B | B | B | B | B | A | A |

| | | Exam-ple 11 | Exam-ple 12 | Exam-ple 13 | Exam-ple 14 | Exam-ple 15 | Exam-ple 16 | Exam-ple 17 | Exam-ple 18 | Compar-ative Example 1 |
|---|---|---|---|---|---|---|---|---|---|---|
| Formulation (parts by mass) | | | | | | | | | | |
| Adhesive base | EVA | | | | | | 100 | | 38 | |
| | EMMA | | | | | | | | | |
| | Modified silicone | | | | | | | 100 | 100 | |
| | EVA emulsion | 100 | | | | | | | | |
| | CR rubber, solvent-based | | 100 | | | | | | | |
| | Acrylic, solvent-based | | | 100 | | | | | | |
| | Epoxy-based | | | | 100 | | | | | |
| | Silicone resin | | | | | 100 | | | | |
| Tackifying resin (Adhesive base) | C9 non-hydrogenated | | | | | | 76 | | | |
| | Rosin | | | | | | | | | |
| Non-adhesive base | Polyethylene | | | | | | | | | 100 |
| Thermally expandable graphite (thermally expandable compound) | Thermally expandable graphite 1 | 35 | 35 | 35 | 35 | 35 | 62 | | | 62 |
| | Thermally expandable graphite 2 | | | | | | | | | |
| | Thermally expandable graphite 3 | | | | | | | | | |
| | Thermally expandable graphite 4 | | | | | | | 81 | 90 | |
| Expandable flame retardant (thermally expandable compound) | Aluminum phosphite | 50 | 50 | 50 | 50 | 50 | 88 | | | 88 |
| | Ammonium poly phosphate 1- | | | | | | | | | |
| | Ammonium poly-phosphate 2 | | | | | | | | | |
| Inorganic filler | Calcium carbonate | | | | | | 31 | 108 | 100 | |
| Others | Poly-merization initiator | | | | | | | | | |
| | Plasticizer | | | | | | | 59 | 62 | |
| | Catalyst | | | | | | | 2 | 2 | |
| Total | | 185 | 185 | 185 | 185 | 185 | 357 | 350 | 392 | 250 |
| Content percentage of adhesive base | Base resin | 54% | 54% | 54% | 54% | 54% | 28% | 29% | 35% | 0 |
| | Tackifying resin | 0% | 0% | 0% | 0% | 0% | 21% | 0% | 0% | 0% |
| (% by mass) | Total | 54% | 54% | 54% | 54% | 54% | 49% | 29% | 35% | 40% |
| Content percentage of thermally | Thermally expandable graphite | 19% | 19% | 19% | 19% | 19% | 17% | 23% | 23% | 25% |

TABLE 1-continued

| | | | | | | | | | | |
|---|---|---|---|---|---|---|---|---|---|---|
| expandable compound (% by | Expandable flame retardant | 27% | 27% | 27% | 27% | 27% | 25% | 0% | 0% | 35% |
| mass | Total | 46% | 46% | 46% | 46% | 46% | 42% | 23% | 23% | 60% |
| Expandable flame retardant thermally expandable graphite (mass ratio) | | 1.43 | 1.43 | 1.43 | 1.43 | 1.43 | 1.42 | 0.00 | 0.00 | 1.42 |
| Content percentage of inorganic filler (% by mass) | | | | | | | | 31% | 26% | |
| Expansion onset temperature of thermally expandable graphite (° C.) | | 180 | 180 | 180 | 180 | 180 | 180 | 160 | 160 | 180 |
| Viscosity(mPa · s) | | 5,000 | 700 | 5,000 | 10,000 | 300,000 | 240,000 | 360,000 | 430,000 | No flowability |
| Fire-resistant performance (600° C., 10 minutes) | Volume expansion ratio (times) | 53.1 | 72.2 | 61.1 | 68.0 | 38.5 | 45 | 41.4 | 58 | 50 |
| | Residual hardness (kgf/cm$^2$) | 0.6 | 0.3 | 0.1 | 0.1 | 0.1 | 0.3 | 0.1 | 0.4 | 0.2 |
| Adhesion to substrate | Before combustion | A | A | A | A | A | A | A | A | B |
| | After combustion (600° C.) | B | B | A | A | B | A | B | A | B |
| | After combustion (500° C.) | A | A | A | A | A | A | A | A | B |
| Adhesion strength SUS-SUS (MPa) | | 0.4 | 2.6 | 1.1 | 9.4 | 0.6 | 1.8 | 0.8 | 1.2 | X |
| Curing or solidification time | | 120 minutes | 20 minutes | 20 minutes | 50 minutes | 20 minutes | 1 second | 30 minutes | 15 minutes | — |
| Sagging (200° C., 10 minutes) | | — | — | — | — | — | A | A | A | — |

*Each of the viscosities in Table 1 is the melt viscosity at 150° C. for Examples 1 to 8 and 16, and the viscosity at an ordinary temperature (23° C.) for Examples 9 to 15, 17 and 18. The thermally expandable fire-resistant material composition in Comparative Example 1 did not flow at 150° C. and the melt viscosity at 150° C. could not thereby be measured.
*The formulation amounts in Table 1 are expressed in parts by mass based on the solid content.

Each of the hot-melt type thermally expandable fire-resistant material compositions of Examples 1 to 8 and 16 was flowable when heated to a temperature lower than the expansion onset temperature of the thermally expandable compound. The heated thermally expandable fire-resistant material composition could be solidified immediately after coated on the iron plate to provide a thermally expandable fire-resistant material that adhered to the iron plate with high adhesion strength. Each of the one-liquid curable type thermally expandable fire-resistant material compositions of Examples 9, 10, 15, 17 and 18 was flowable at an ordinary temperature. It could be cured a relatively short time after it was coated on an iron plate and left at an ordinary temperature to provide a thermally expandable fire-resistant material that adhered to the iron plate with high adhesion strength.

Each of the emulsion type- or solvent-based one-liquid curable type thermally expandable fire-resistant material compositions of Examples 11 to 13 was flowable at an ordinary temperature. It could be solidified a relatively short time after it was coated on an iron plate and left at an ordinary temperature to provide a thermally expandable fire-resistant material that adhered to the iron plate with high adhesion strength. The two-liquid curable type thermally expandable fire-resistant material composition of Examples 14 was flowable at an ordinary temperature immediately after Liquid 1 and Liquid 2 were mixed. It could be solidified a relatively short time after it was coated on an iron plate and left at an ordinary temperature to provide a thermally expandable fire-resistant material that adhered to the iron plate with high adhesion strength. The thermally expandable fire-resistant material of each Example was good in adhesion also after combustion.

In addition, the thermally expandable fire-resistant material obtained in each Example was high in volume expansion ratio after combustion, high in residue hardness and excellent in fire-resistant performance.

In contrast, the thermally expandable fire-resistant material composition of Comparative Example 1 did not flow even when heated to the expansion onset temperature of the thermally expandable compound, and could not be adhered to the iron plate with high adhesion strength.

The invention claimed is:

1. A thermally expandable fire-resistant material composition comprising an adhesive base and a thermally expandable compound, wherein:

the thermally expandable fire-resistant material composition is flowable at a temperature lower than the expansion onset temperature of the thermally expandable compound, and is solidifiable or curable, the adhesive base comprises a hot-melt adhesive base in an amount of 50 to 100% by mass based on the total amount of the adhesive base, the hot-melt adhesive comprises a base resin and a tackifying resin, the base resin is at least one selected from the group consisting of an ethylene-vinyl acetate copolymer resin, an ethylene-(meth) acrylate copolymer resin, a polyolefin-based resin, and a rubber, the tackifying resin is at least one selected from the group consisting of a rosin-based tackifying resin, a terpene-based tackifying resin, a petroleum resin-based tackifying resin, and a coumarone resin-based tackifying resin, the adhesive base is non-flowable at 23° C., becomes flowable by heating above 23° C., and solidifies again when cooled to 23° C., a crosslinkable silyl group-containing polymer is excluded from the adhesive base, and a melt viscosity at 150° C. of the thermally expandable fire-resistant material composition is 300,000 mPa·s or less.

2. The thermally expandable fire-resistant material composition according to claim 1, wherein the adhesive base further comprises one or more selected from the group consisting of a one-liquid curable adhesive base, a two-liquid curable adhesive base, an emulsion-type adhesive base and a solvent-based adhesive base.

3. The thermally expandable fire-resistant material composition according to claim 1, comprising the thermally expandable compound in the range of 10 to 300 parts by mass and the tackifying resin in the range of 10 to 300 parts by mass, with respect to 100 parts by mass of the base resin.

4. The thermally expandable fire-resistant material composition according to claim 1, wherein the thermally expandable compound comprises a thermally expandable graphite.

5. The thermally expandable fire-resistant material composition according to claim 4, wherein the thermally expandable compound further comprises an expandable flame retardant.

6. A thermally expandable fire-resistant material, obtained by solidifying or curing the thermally expandable fire-resistant material composition according to claim 1.

7. The thermally expandable fire-resistant material according to claim 6, which has a volume expansion ratio of 10 times or more when heated at 600° C. for 10 minutes, and a residue hardness of 0.1 kgf/cm$^2$ or more.

8. A method for producing a thermally expandable fire-resistant material, comprising:

a step of coating or filling, an object to be applied, with the thermally expandable fire-resistant material composition according to claim 1; and a step of solidifying or curing the thermally expandable fire-resistant material composition with which the object to be applied has been coated or filled.

9. The method for producing a thermally expandable fire-resistant material according to claim 8, wherein the method further comprises a step of melting the thermally expandable fire-resistant material composition.

10. The thermally expandable fire-resistant material composition according to claim 1, wherein the base resin is the ethylene-vinyl acetate copolymer resin.

11. The thermally expandable fire-resistant material composition according to claim 10, wherein a vinyl acetate content of the ethylene-vinyl acetate copolymer resin is 15 to 45% by mass.

12. The thermally expandable fire-resistant material composition according to claim 1, further comprising an inorganic filler other than the thermally expandable compound.

13. The thermally expandable fire-resistant material composition according to claim 5, wherein the expandable flame retardant is selected from the group consisting of ammonium polyphosphate and aluminum phosphite.

14. The thermally expandable fire-resistant material composition according to claim 1, wherein the base resin is at least one selected from the group consisting of an ethylene-vinyl acetate copolymer resin, an ethylene-(meth) acrylate copolymer resin, and a polyolefin-based resin.

* * * * *